(12) United States Patent
Samuelsson et al.

(10) Patent No.: US 9,912,172 B2
(45) Date of Patent: Mar. 6, 2018

(54) ASYMMETRICALLY LAYERED STACKED COILS AND/OR CHAMFERED FERRITE IN WIRELESS POWER TRANSFER APPLICATIONS

(71) Applicant: QUALCOMM Incorporated, San Diego, CA (US)

(72) Inventors: Johan Gabriel Samuelsson, Aying (DE); Michael Werner, Markt Schwaben (DE); Maciej Krzysztof Skowron, Munich (DE)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 14/809,937

(22) Filed: Jul. 27, 2015

(65) Prior Publication Data

US 2016/0204618 A1    Jul. 14, 2016

Related U.S. Application Data

(60) Provisional application No. 62/103,430, filed on Jan. 14, 2015, provisional application No. 62/103,417, filed on Jan. 14, 2015.

(51) Int. Cl.
*H01F 5/02*      (2006.01)
*H01F 38/14*     (2006.01)
(Continued)

(52) U.S. Cl.
CPC ............... *H02J 5/005* (2013.01); *H01F 5/02* (2013.01); *H01F 38/14* (2013.01); *H01F 41/071* (2016.01);
(Continued)

(58) Field of Classification Search
CPC .......... H01F 5/02; H01F 38/14; H01F 41/071; H01F 41/074; H02J 5/005; H02J 7/025;
(Continued)

(56) References Cited

U.S. PATENT DOCUMENTS 8,760,255 B2    6/2014  Yang et al.
8,922,066 B2 *  12/2014  Kesler ................. B60L 11/1812
                                                 307/104
(Continued)

FOREIGN PATENT DOCUMENTS

CN       103986245 A     8/2014
JP       2014082339 A    5/2014
(Continued)

OTHER PUBLICATIONS

International Search Report and Written Opinion—PCT/US2015/066136—ISA/EPO—dated Apr. 19, 2016.

*Primary Examiner* — Levi Gannon
(74) *Attorney, Agent, or Firm* — Knobbe, Martens, Olson & Bear, LLP

(57) ABSTRACT

An apparatus for wirelessly transferring power comprises a first coil having a first winding path and a second winding path. The apparatus comprises a holder configured to hold the first coil and the second coil in a predetermined winding pattern. Each of the first and second winding paths comprise a plurality of successive winding groups. In each of the plurality of successive winding groups, at least a portion of each winding of consecutive windings is disposed on top of an immediately previous winding on the holder for a predetermined number of windings. Each of the successive winding groups of the first winding path is disposed along an outer perimeter of an immediately previous winding group and each of the successive winding groups of the second
(Continued)

winding path is disposed along an inner perimeter of an immediately previous winding group.

28 Claims, 12 Drawing Sheets

(51) Int. Cl.
 *H02J 5/00* (2016.01)
 *H02J 7/02* (2016.01)
 *H02J 17/00* (2006.01)
 *H02J 50/10* (2016.01)
 *H01F 41/071* (2016.01)
 *H01F 41/074* (2016.01)

(52) U.S. Cl.
 CPC ............ *H01F 41/074* (2016.01); *H02J 7/025* (2013.01); *H02J 17/00* (2013.01); *H02J 50/10* (2016.02)

(58) Field of Classification Search
 CPC . H02J 17/00; H02J 50/10; H02J 50/12; H04B 5/0037; H04B 5/0075; H04B 5/0093
 USPC .................................. 307/104; 336/228, 231

See application file for complete search history.

(56) References Cited

U.S. PATENT DOCUMENTS

| | | | |
|---|---|---|---|
| 9,666,360 B2* | 5/2017 | Azancot | H01F 38/14 |
| 2007/0091519 A1* | 4/2007 | Abe | H01F 38/14 361/38 |
| 2010/0176908 A1* | 7/2010 | Mori | H01F 17/0013 336/226 |
| 2012/0235636 A1* | 9/2012 | Partovi | H02J 7/025 320/108 |
| 2013/0008179 A1* | 1/2013 | Mitchell | H01F 38/14 60/796 |
| 2013/0071218 A1* | 3/2013 | Hosek | H01L 21/67259 414/744.5 |
| 2013/0214890 A1 | 8/2013 | Zabaco | |
| 2013/0264885 A1* | 10/2013 | Lee | H02J 17/00 307/104 |
| 2014/0125140 A1 | 5/2014 | Widmer et al. | |
| 2014/0327391 A1 | 11/2014 | Niederhauser et al. | |
| 2015/0130979 A1* | 5/2015 | Huang | H01F 38/14 348/333.01 |
| 2015/0263528 A1* | 9/2015 | Kitamura | H01F 27/2804 307/104 |
| 2016/0197511 A1* | 7/2016 | Atasoy | H02J 7/025 307/104 |

FOREIGN PATENT DOCUMENTS

| | | |
|---|---|---|
| JP | 2014239168 A | 12/2014 |
| WO | WO-2011116874 A2 | 9/2011 |
| WO | WO-2014011059 A1 | 1/2014 |

* cited by examiner

ASYMMETRICALLY LAYERED STACKED COILS AND/OR CHAMFERED FERRITE IN WIRELESS POWER TRANSFER APPLICATIONS

CROSS REFERENCE TO RELATED APPLICATIONS

This application claims priority to: 1) Provisional Application No. 62,103,417 entitled "METHODS AND APPARATUS UTILIZING HIGHLY INTEGRATED WIRELESS ELECTRIC VEHICLE CHARGING PADS COMPRISING CHAMFERED FERRITE" filed Jan. 14, 2015, and 2) Provisional Application No. 62,103,430 entitled "ASYMMETRICALLY LAYERED STACKED COILS IN WIRELESS POWER TRANSFER APPLICATIONS" filed Jan. 14, 2015. The disclosure of each is hereby expressly incorporated in its entirety by reference herein.

FIELD

This application is generally related to wireless power charging of chargeable devices such as electric vehicles, and more specifically to asymmetrically layered stacked coils and/or chamfered ferrite in wireless power transfer applications.

BACKGROUND

Wireless power transfer systems utilize a primary coil to generate an alternating magnetic field from which a secondary or receiving coil may wirelessly extract energy. In some cases, the primary and/or secondary coils may be stacked to optimize pad size and performance. However, conventional stacked coil winding processes are less accurate and more time consuming than some other coil winding processes. Moreover, some coil routing schemes for transitioning from one coil to another coil in a "double D" coil arrangement require a small bend radius that can deform Litz wire and further requires a gap between coils where a "double D" coil arrangement is utilized, which worsens magnetic performance of the coil arrangement. Moreover, to keep base and vehicle pad heights low, the sizes of ferrite structures within base and vehicle pads have to be reduced to ensure clearance for the coil arrangement, especially in transition areas from single coil layers to multiple coil layers. Previous solutions have included substantially reducing the absolute lateral dimensions of the ferrite structures to accommodate the stacked coil structure. However, such solutions generally require an increase in the ferrite structure's thickness to offset an otherwise reduced ferrite volume, which can adversely affect pad thickness. Accordingly, asymmetrically layered stacked coils and/or chamfered ferrite are desirable in wireless power transfer applications.

SUMMARY

According to some implementations, an apparatus for wirelessly transferring charging power is provided. The apparatus comprises a first coil having a first winding path. The apparatus comprises a second coil having a second winding path. The apparatus comprises a holder configured to hold the first coil and the second coil in a predetermined winding pattern. Each of the first winding path and the second winding path comprise a plurality of successive winding groups and, in each of the plurality of successive winding groups, at least a portion of each winding of consecutive windings is disposed on top of an immediately previous winding on the holder for a predetermined number of windings. Each of the successive winding groups of the first winding path is disposed along an outer perimeter of an immediately previous winding group and each of the successive winding groups of the second winding path is disposed along an inner perimeter of an immediately previous winding group.

In some other implementations, a method for wirelessly transferring power is provided. The method comprises energizing each of a first coil and a second coil disposed in a holder with an electrical current. The first coil has a first winding path and the second coil has a second winding path. The method further comprises wirelessly transferring charging power via the first coil and the second coil. Each of the first winding path and the second winding path comprises a plurality of successive winding groups and, in each of the plurality of successive winding groups, at least a portion of each winding of consecutive windings is disposed on top of an immediately previous winding on the holder for a predetermined number of windings. Each of the successive winding groups of the first winding path is disposed along an outer perimeter of an immediately previous winding group and each of the successive winding groups of the second winding path is disposed along an inner perimeter of an immediately previous winding group.

In yet other implementations a non-transitory computer-readable medium is provided. The medium comprises code that, when executed, causes an apparatus for wirelessly transferring charging power to perform a method. The method comprises energizing each of a first coil and a second coil disposed in a holder with an electrical current. The first coil has a first winding path and the second coil has a second winding path. The method further comprises wirelessly transferring charging power via the first coil and the second coil. Each of the first winding path and the second winding path comprise a plurality of successive winding groups and, in each of the plurality of successive winding groups, at least a portion of each winding of consecutive windings is disposed on top of an immediately previous winding on the holder for a predetermined number of windings. Each of the successive winding groups of the first winding path is disposed along an outer perimeter of an immediately previous winding group and each of the successive winding groups of the second winding path is disposed along an inner perimeter of an immediately previous winding group.

In yet other implementations, a method for fabricating an apparatus for wirelessly transferring charging power is provided. The method comprises winding a first coil in a holder along a first winding path and comprising plurality of successive winding groups. Each of the plurality of successive winding groups is disposed along an outer perimeter of an immediately previous winding group. The method further comprises winding a second coil in the holder along a second winding path in and comprising a plurality of successive winding groups. Each of the plurality of successive winding groups is disposed along an inner perimeter of an immediately previous winding group. In each of the plurality of successive winding groups of each of the first winding path and the second winding path, at least a portion of each winding of consecutive windings is disposed on top of an immediately previous winding on the holder for a predetermined number of windings.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Figure 1:
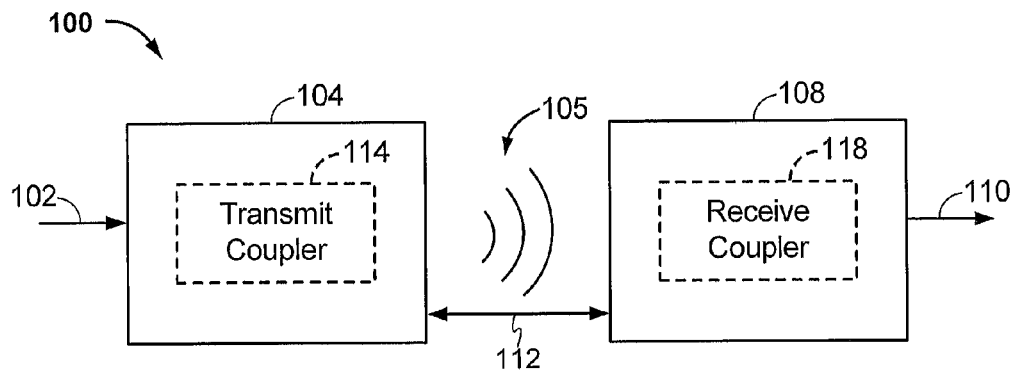
FIG. 1 is a functional block diagram of a wireless power transfer system, in accordance with some implementations.

In the following detailed description, reference is made to the accompanying drawings, which form a part of the present disclosure. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive coupler" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicles may be hybrid electric vehicles that include a traditional combustion engine for direct locomotion or for charging the vehicle's battery in addition to electric motors. Other electric vehicles may draw all locomotive ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

The terminology used herein is for the purpose of describing particular implementations only and is not intended to be limiting of the disclosure. It will be understood that if a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

FIG. 1 is a functional block diagram of a wireless power transfer system 100, in accordance with an exemplary implementation. An input power 102 may be provided to a transmitter 104 from a power source (not shown) to generate a time varying wireless (e.g., magnetic or electromagnetic) field 105 with a frequency corresponding to the resonant frequency of the transmit coupler 114 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one example implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 of the transmit coupler 114 (e.g., a transmit coil) to the receive coupler 118 (e.g., a receive coil), residing in the vicinity of the wireless field 105, rather than propagating the energy from the transmit coupler 114 into free space.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit coupler 114 for coupling energy to the receiver 108. The receiver 108 may include a receive coupler 118 for receiving or capturing energy transmitted from the transmitter 104. The near-field may correspond to a region in which there are strong reactive fields resulting from the currents and charges in the transmit coupler 114 that minimally radiate power away from the transmit coupler 114. The near-field may correspond to a region that is within about one wavelength (or a fraction thereof) of the transmit coupler 114.

As described above, efficient energy transfer may occur by coupling a large portion of the energy in the wireless field 105 to the receive coupler 118 rather than propagating most of the energy in an electromagnetic wave to the far field. When positioned within the wireless field 105, a "coupling mode" may be developed between the transmit coupler 114 and the receive coupler 118. The area around the transmit coupler 114 and the receive coupler 118 where this coupling may occur is referred to herein as a coupling-mode region.

Figure 2:
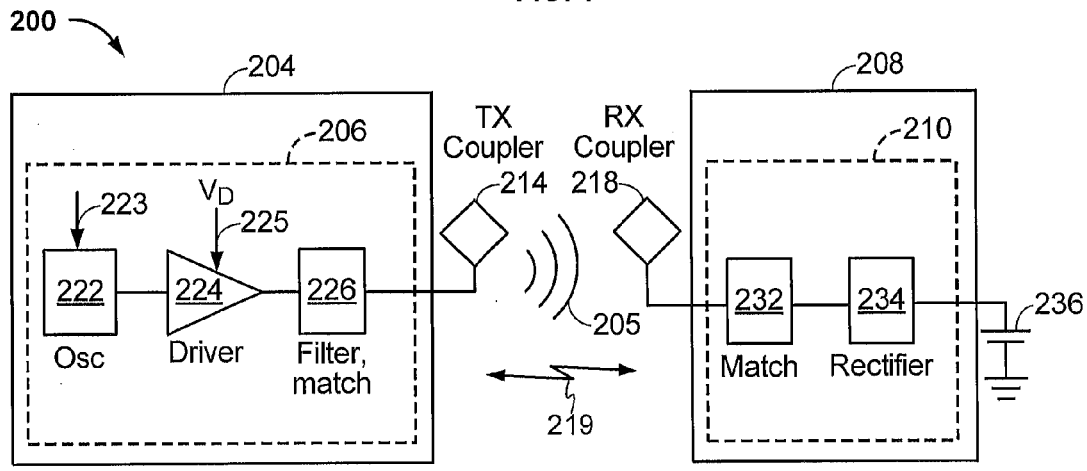
FIG. 2 is a functional block diagram of a wireless power transfer system, in accordance with some other implementations.

FIG. 2 is a functional block diagram of a wireless power transfer system 200, in accordance with another exemplary implementation. The system 200 may be a wireless power transfer system of similar operation and functionality as the system 100 of FIG. 1. However, the system 200 provides additional details regarding the components of the wireless power transfer system 200 as compared to FIG. 1. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit coupler 214 at a resonant frequency of the transmit coupler 214 based on an input voltage signal ($V_D$) 225.

The filter and matching circuit 226 may filter out harmonics or other unwanted frequencies and match the impedance of the transmitter 204 to the transmit coupler 214. As a result of driving the transmit coupler 214, the transmit coupler 214 may generate a wireless field 205 to wirelessly output power at a level sufficient for charging a battery 236 of the electric vehicle, for example.

The receiver 208 may include a receive circuitry 210 that may include a matching circuit 232 and a rectifier circuit 234. The matching circuit 232 may match the impedance of the receive circuitry 210 to the impedance of the receive coupler 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc.). The receiver 208 and the transmitter 204 may alternatively communicate via in-band signaling using characteristics of the wireless field 205. In some implementations, the receiver 208 may be configured to determine whether an amount of power transmitted by the transmitter 204 and received by the receiver 208 is appropriate for charging the battery 236.

Figure 3:
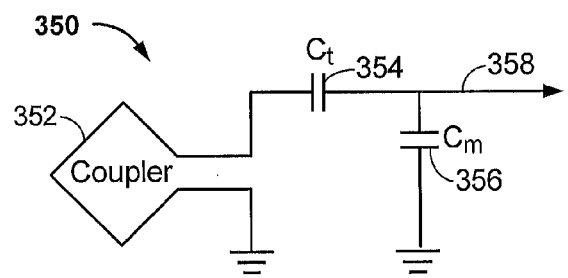
FIG. 3 is a schematic diagram of a portion of transmit circuitry or receive circuitry of FIG. 2 including a transmit or receive coupler, in accordance with some implementations.

FIG. 3 is a schematic diagram of a portion of the transmit circuitry 206 or the receive circuitry 210 of FIG. 2, in accordance with some exemplary implementations. As illustrated in FIG. 3, a transmit or receive circuitry 350 may include a coupler 352. The coupler 352 may also be referred to or be configured as a "conductor loop" 352 or as a "magnetic" coupler. The term "coupler" generally refers to a component that may wirelessly output or receive energy for coupling to another "coupler."

The resonant frequency of the loop or magnetic couplers is based on the inductance and capacitance of the loop or magnetic coupler. Inductance may be simply the inductance created by the coupler 352, whereas, capacitance may be added to the coupler's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger sized couplers using large diameter couplers exhibiting larger inductance, the value of capacitance needed to produce resonance may be lower. Furthermore, as the size of the coupler increases, coupling efficiency may increase. This is mainly true if the size of both base and electric vehicle couplers increase. For transmit couplers, the signal 358, with a frequency that substantially corresponds to the resonant frequency of the coupler 352, may be an input to the coupler 352.

Figure 4:
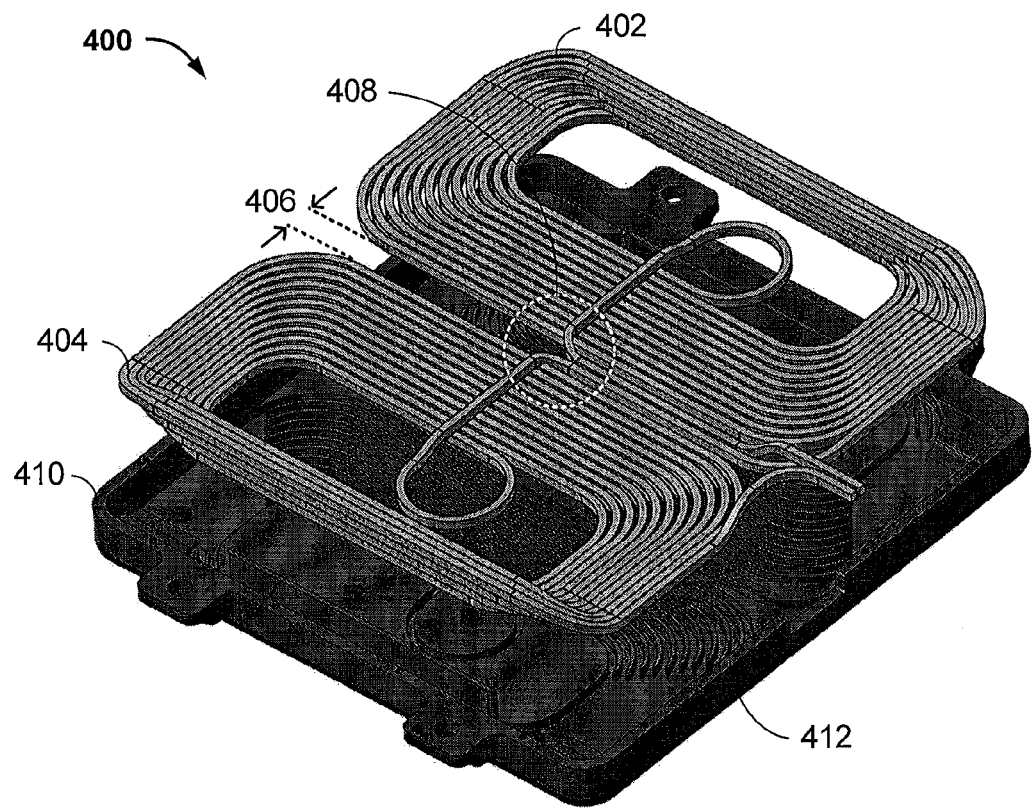
FIG. 4 illustrates an exploded isometric view of a "double D" coil arrangement having a gap between the coils and an associated holder.

FIG. 4 illustrates an exploded isometric view 400 of a "double D" coil arrangement having a gap 406 between first 402 and second 404 coils and an associated holder 410. The "double D" coil arrangement includes a first stacked coil 402 and a second stacked coil 404 connected to one another in series, or wound from the same conductor. The "double D" coil arrangement includes a gap 406 between the first coil 402 and the second coil 404. This gap 406 is provided to route the conductor (e.g., a Litz wire) into the coil arrangement and to transition the conductor from the windings of the first coil 402 to the windings of the second coil 404. In such implementations, the first coil 402 may be wound from the center out. However, within the gap 406 and within a gap in a ferrite channel (not shown), the conductor must be bent at a small radius 408, which can deform the Litz wire conductor and adversely affect performance. Furthermore, the gap 406 in the design of FIG. 4 can cause deterioration in the uniformity and strength of an alternating magnetic field generated by the coil arrangement, which can have direct and adverse effects on the efficiency and uniformity of wireless power transfer.

During fabrication, assembly or construction, the first coil 402 may be wound from the bottom up and from the inside out with respect to the coil arrangement orientation in FIG. 4. For example, in tracing the conductor beyond the small radius bend 408, the conductor is wound such that, on one side of the coil 402 (e.g., the inside of the coil 402 adjacent to the gap 406), the first turns of the conductor are wound on a first layer from the inside of the coil 402 to the outside of the coil 402. After the first layer of windings has been laid, a second layer of windings is laid over the first layer of windings, again, from the inside out. This winding pattern is continued until the total number of windings in the first coil 402 have been laid. As can be seen, on the other side of the coil, the windings are all wound on the first layer (e.g., the same layer) from the inside out and not one on top of another.

Once the first coil 402 has been wound, the conductor is routed through the gap 406 between the coils 402 and 404, bent at the small radius 408 as for the first coil 402, and then wound from the bottom up and from the inside out, for each layer on one side of the second coil 404 (e.g., the outside of the coil 404), while each winding on the other side of the second coil 404 (e.g., the inside of the coil 404 adjacent to the gap 406) is wound on the first layer (e.g., the same layer) from the inside out and not one on top of another. The conductor is finally output from the arrangement at the gap 406 from the outside of the second coil 404.

As further illustrated in FIG. 4, a coil holder 410 may be utilized to facilitate accurate and efficient winding. As shown, the holder 410 may include a plurality of ribs 412 for guiding the conductor along each of the turns on the inside edges (e.g., the other side of each coil as previously described) but may not include ribs to hold the conductor in place for each of the windings that are wound from the bottom up and inside out on the outside (e.g., the one side of each coil as previously described) in the design of FIG. 4. Moreover, in the wound coils shown in FIG. 4, the number of turns (e.g., windings) in the first coil 402 may not be the same as the number of turns (e.g., windings) in the second coil 404, thus reducing magnetic performance.

Figure 5:
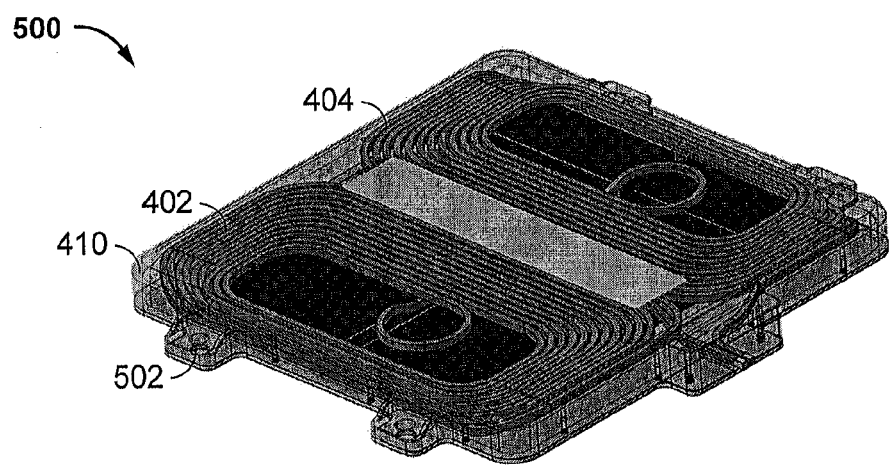
FIG. 5 illustrates an isometric view of an assembled pad including the coil arrangement and associated holder of FIG. 4 flipped for mounting.

FIG. 5 illustrates an isometric view 500 of an assembled pad including the coil arrangement and associated holder 410 of FIG. 4 flipped for mounting. As shown, the coil arrangement including the first coil 402 and the second coil 404 installed in the holder 410 may be flipped from the view shown in FIG. 4 and mounted to a base pad or receiver pad via one or more mounting holes or brackets 502. Thus, in FIG. 5, all "bottom up," "top down," "first layer," "second layer," and "over" descriptions of FIG. 4 would be reversed in FIG. 5.

Figure 6:
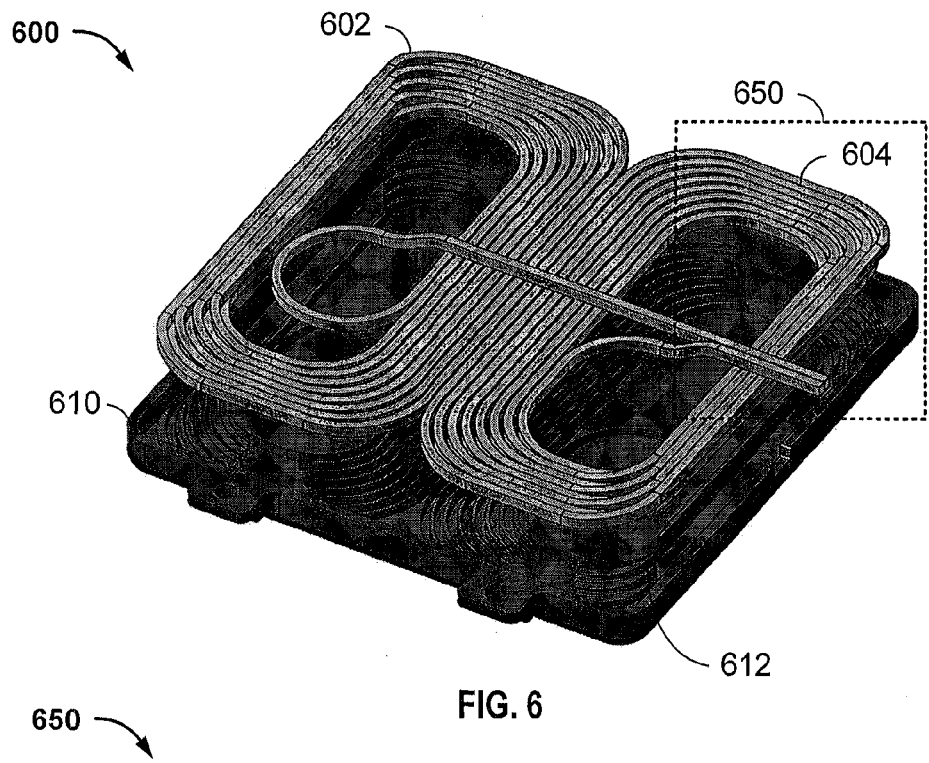
FIG. 6 illustrates an exploded isometric view of a symmetrically wound "double D" coil arrangement and associated holder, in accordance with some implementations.

FIG. 6 illustrates an exploded isometric view 600 of a symmetrically wound "double D" coil arrangement and an associated holder 610, in accordance with some implementations. As shown in FIG. 6, the "double D" coil arrangement includes a first stacked coil 602 and a second stacked coil 604 connected to one another in series, or wound from the same conductor. In contrast to the design of FIGS. 4 and 5, in FIG. 6 the "double D" coil arrangement does not include a gap between the first coil 602 and the second coil 604, since the conductor is now wound symmetrically and the input and output of the conductor are routed to an edge of the coil arrangement over or under the windings, and perpendicular to the windings at the point of crossing. In such implementations, the first coil 602 may be wound from its center to its outside and the second coil 604 may be wound from its outside to its center. Thus, the winding is symmetrical about an axis running between the first coil 602 and the second coil 604. In such implementations, a coil holder 610 may be utilized to facilitate accurate and efficient winding. As shown, the holder 610 may include a plurality of ribs 612 for guiding the conductor along each of the turns on the inside edges (e.g., the other side of each coil as previously described). The ribs 612 may also be used as a ramp to guide every other turn to the next level or layer of windings.

During fabrication or construction, the first coil 602 may be wound from the bottom up and from the inside out, though completing each inside set of layers of windings before extending outward to the next set of layers of windings. For example, the conductor is wound such that, on one side of the coil 602 (e.g., the outside of the coil), a first winding is wound as the innermost turn on a first layer. A second winding is then wound on a second layer over the first winding. A third winding may then be wound outside the first and second windings and on the first layer (e.g., the same layer as the first winding). A fourth winding is then wound on the second layer over the third winding and adjacent to the second winding. Fifth, sixth, seventh and eighth windings may be wound as previously described for the first through fourth windings, however, outside those windings. This winding pattern is continued until the total number of windings in the first coil 602 have been laid down. As can be seen in FIG. 6, on the other side of the coil (e.g., the inside of the coil 602 adjacent to the second coil 604), the windings are all wound on the first layer (e.g., the same layer) from the inside out and not one on top of another.

Figure 7:
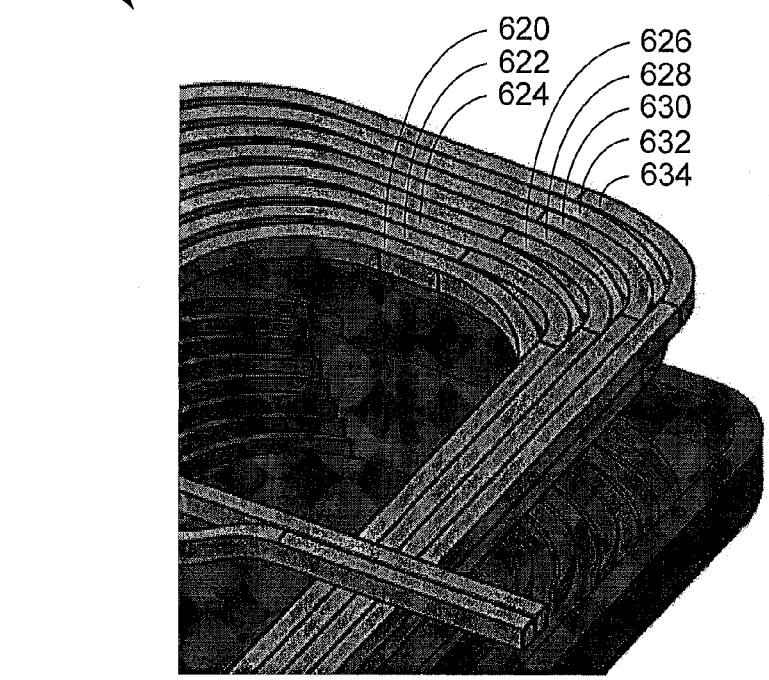
FIG. 7 illustrates an exploded isometric view of a portion of the symmetrically wound "double D" coil arrangement and the associated holder of FIG. 6, in accordance with some implementations.

To more clearly delineate the differences between FIGS. 4-5 and FIG. 6 reference may be made to FIG. 7. FIG. 7 illustrates an exploded isometric view of a portion 650 of the symmetrically wound "double D" coil arrangement and the associated holder 610 of FIG. 6, in accordance with some implementations. Once the first coil 602 has been wound, the conductor is then wound to form the second coil 604 from the top down, and from the outside in, for each layer in the reverse of that described for the first coil 604, while each winding on the other side of the second coil 604 is wound on the first layer (e.g., the same layer) from the outside in and not one on top of another. For example, a first winding 634 is wound over a second winding 632. A third winding 630 is then wound over a fourth winding 628, where the third 630 and fourth 628 windings are wound inside and adjacent to the first 634 and second 632 windings, respectively. Likewise, a fifth 626, sixth 624, seventh 622 and eighth 620 windings may be wound as previously described for the first 634 through the fourth 628 windings, respectively, though inside those windings. The conductor is finally output from the arrangement from the center of the second coil 604 and over or under the first coil and the second coil 602/504 adjacent to the input of the conductor. Since the second coil 604 is wound symmetrically with the first coil 602, the second coil 604 cannot be wound from the bottom up like the first coil 602, though the gap 406 as shown in FIG. 4 has been eliminated. Thus, there is a need for providing a coil arrangement that does not require a gap between the first coil and the second coil, nor a small-radius bend in the conductor of the first coil and the second coil, that can be wound from the bottom up for each of the first coil and the second coil, and that can be guided by ribs and/or ramps in an associated holder for each winding.

Figure 8:
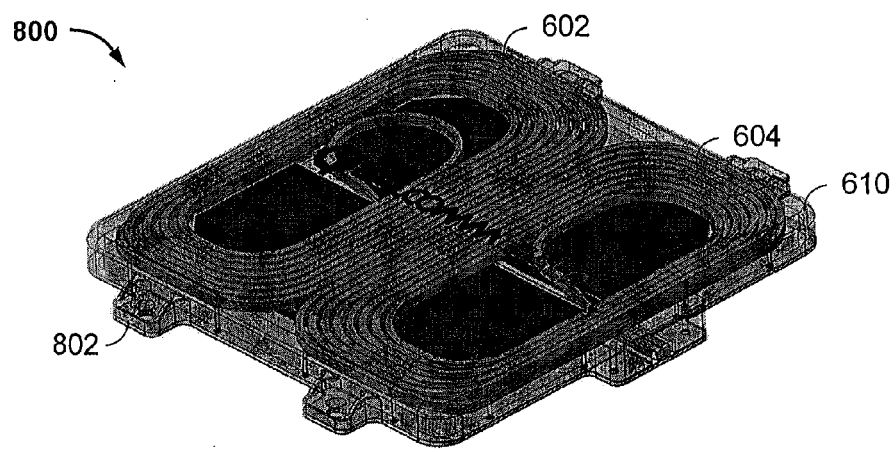
FIG. 8 illustrates an isometric view of an assembled pad including the coil arrangement and associated holder of FIGS. 6 and 7 flipped for mounting, in accordance with some implementations.

FIG. 8 illustrates an isometric view 800 of an assembled pad including the coil arrangement and associated holder of FIGS. 6 and 7 flipped for mounting, in accordance with some implementations. As shown, the coil arrangement including the first coil 602 and the second coil 604 installed in the holder 610 may be flipped from the view shown in FIG. 6 and mounted via one or more mounting holes or brackets 802. Thus, in the view of FIGS. 6 and 7, all "bottom up," "top down," "first layer," "second layer," and "over" descriptions of FIGS. 6 and 7 would be reversed in FIG. 8.

Figure 9:
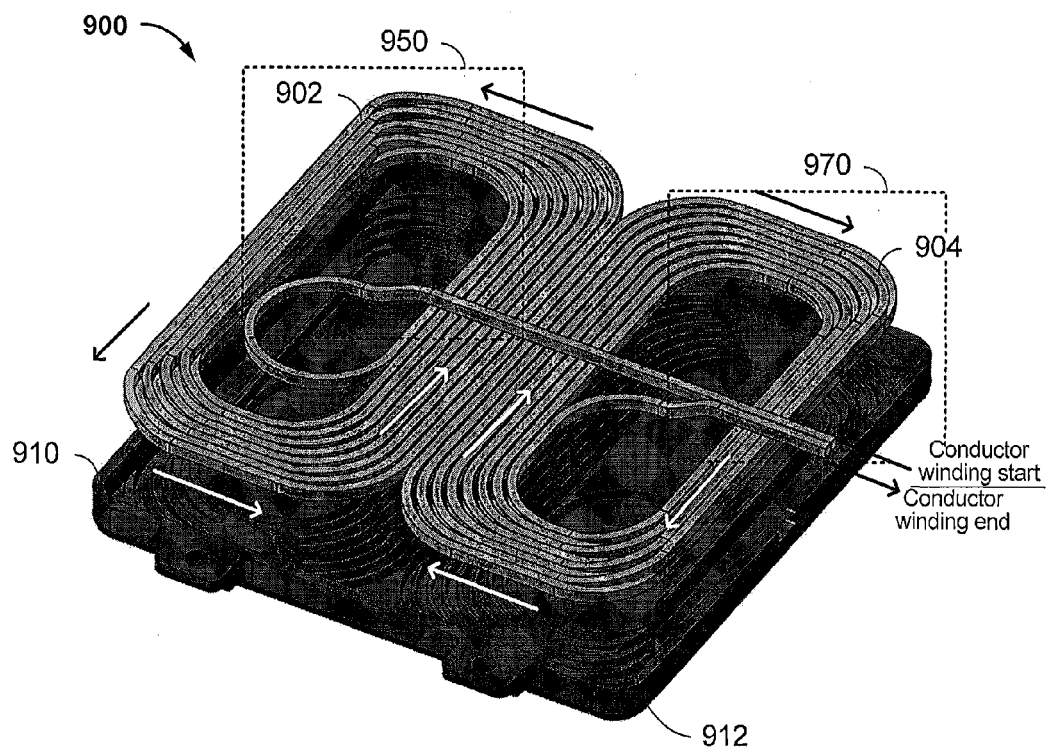
FIG. 9 illustrates an exploded isometric view of an asymmetrically wound "double D" coil arrangement and associated holder, in accordance with some implementations.

FIG. 9 illustrates an exploded isometric view 900 of an asymmetrically wound "double D" coil arrangement and associated holder 910, in accordance with some implementations. As shown in FIG. 9, the "double D" coil arrangement includes a first stacked coil 902 and a second stacked coil 904 connected to one another in series, or wound from the same conductor. For the purposes of term definition, a "double D" configuration or arrangement comprises at least two coils disposed adjacent to one another such that they look substantially like two letter "Ds" next to one another. For a "double D" arrangement, the coils are not required to actually be shaped like the letter "D," only that they be disposed adjacent to and not substantially overlap one another. As shown, the "double D" coil arrangement does not include the gap shown in FIG. 4 between the first coil 902 and the second coil 904. Moreover, the input and output of the conductor, wound to form the first coil 902 and the second coil 904, are routed over or under the fully wound coils to an edge of the arrangement. Thus, the conductor does not require the small-radius bend 408 illustrated in FIG. 4. Since there is no gap between the first coil 902 and the second coil 904, there will be no associated deterioration in the uniformity and strength of an alternating magnetic field generated by the coil arrangement. The conductor is wound to form the first coil 902 having a first winding path, and the second coil 904 having a second winding path, in the direction of the arrows, as described below. For example, the first coil 902 will be wound in an opposite direction from the second coil 904 (e.g., a clockwise direction and a counter-clockwise direction, respectively, or vice versa). Thus, the first coil 902 and the second coil 904 are disposed adjacent to and sufficiently close to one another such that a gap large enough to route either of the first winding path and the second winding path (e.g., the gap 406 shown in FIG. 4) is not present between the first coil 902 and the second coil 904.

Figure 10:
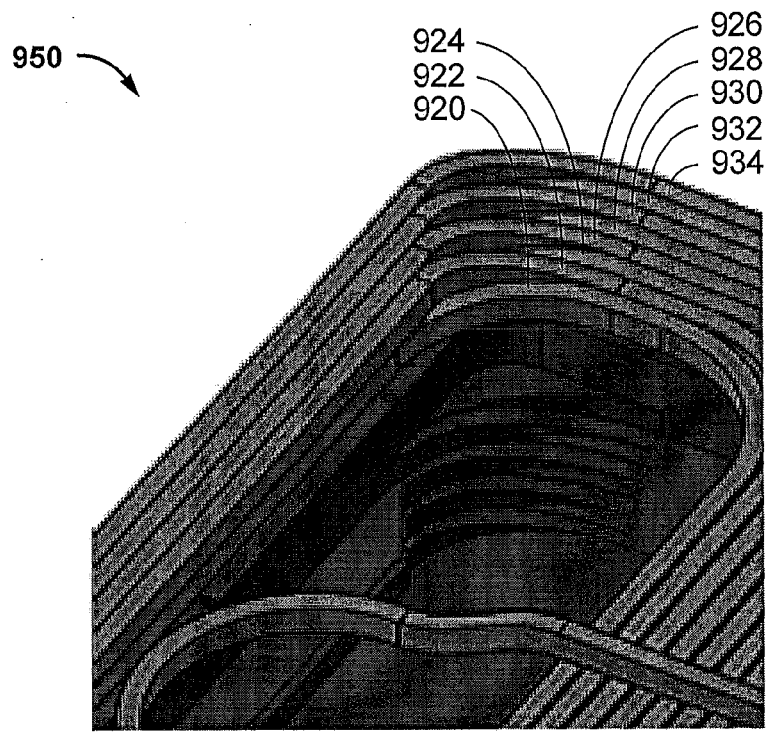
FIG. 10 illustrates an exploded isometric view of a portion of a first coil of the asymmetrically wound "double D" coil arrangement and the associated holder of FIG. 9, in accordance with some implementations.
Figure 11:
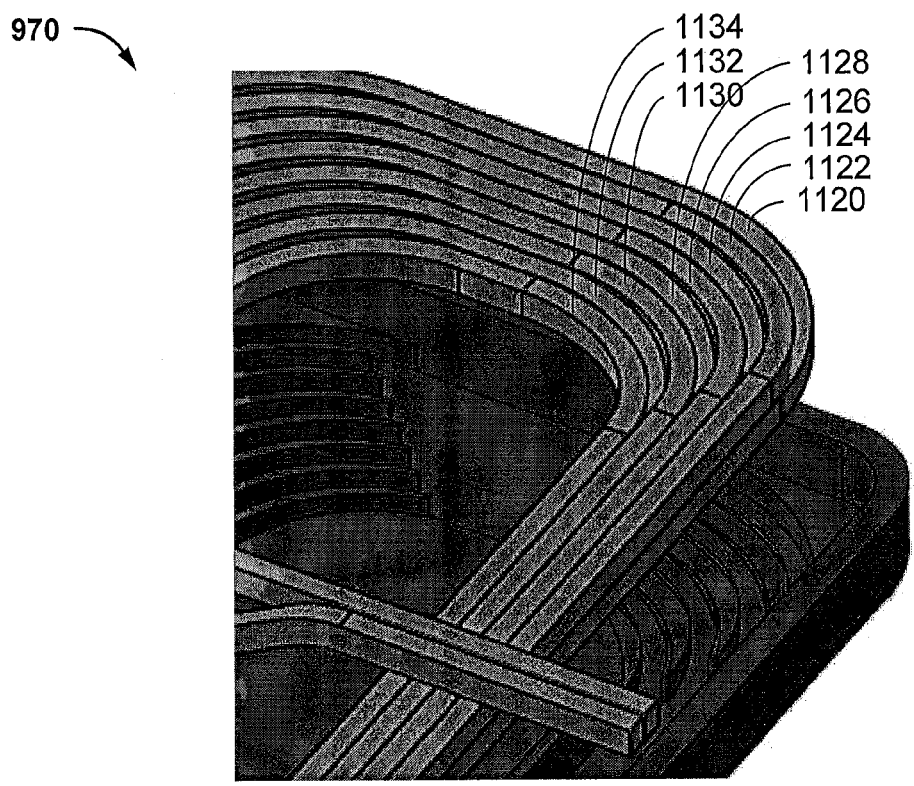
FIG. 11 illustrates an exploded isometric view of a portion of a second coil of the asymmetrically wound "double D" coil arrangement and the associated holder of FIG. 9, in accordance with some implementations.

To more clearly delineate the differences between FIGS. 4-8 and FIG. 9, reference may be made to FIGS. 10 and 11. FIG. 10 illustrates an exploded isometric view of a portion 950 of the first coil 902 of the asymmetrically wound "double D" coil arrangement and the associated holder 910 of FIG. 9, in accordance with some implementations. As shown in FIG. 10, during fabrication or construction, the first coil 902 may be wound from the bottom up and from the inside out, though completing each set of layers of windings (e.g., a winding group) before extending outward to the next set of layers of windings (e.g., a successive winding group). For example, the conductor is wound such that, on one side of the coil 902 (e.g., at least a portion of the coil corresponding to the outside of the coil), a first winding 920 is wound as the innermost turn on a first layer. The second winding 922 is then wound on a second layer over the first winding 920. A third winding 924 may then be wound outside the first 920 and second 922 windings and on the first layer (e.g., the same layer as the first winding 920). A fourth winding 926 is then wound on the second layer over the third winding 924 and adjacent to the second winding 922. The fifth 928, sixth 930, seventh 932 and eighth 934 windings may be wound as previously described for the first 920 through fourth 926 windings, however, outside those windings. This winding pattern is continued until the total number of windings in the first coil 902 have been laid. On the other side of the first coil 902 (e.g., the inside of the coil 902 adjacent to the second coil 904), the windings are all wound on the first layer (e.g., the same layer) from the inside out and not one on top of another. However, the present application is not so limited and the portions of the windings on the inside of the first coil 902 adjacent to the second coil 904 (or any other portion including the entire first coil 902) may be wound and stacked as described for the outside portion of the first coil 902.

FIG. 11 illustrates an exploded isometric view of a portion 970 of a second coil 904 of the asymmetrically wound "double D" coil arrangement and the associated holder 910 of FIG. 9, in accordance with some implementations. As shown in FIG. 11, once the first coil 902 has been wound, the conductor is then wound to form the second coil 904, also from the bottom up, but from the outside in (the reverse of the first coil 902), while each winding on the other side of the second coil 904 (e.g., the inside of the second coil 904 adjacent to the first coil 902) is wound on the first layer (e.g., the same layer) from the outside in not one on top of another. However, the present application is not so limited and the portions of the windings on the inside of the second coil 904 adjacent to the first coil 902 (or any other portion including the entire second coil 904) may be wound and stacked as described for the outside portion of the second coil 904. Thus, the first coil 902 is connected in series with the second coil 904 and may even be wound from the same conductor. Such an example conductor may be Litz wire, which comprises a plurality of conductors continuously braided from an outside of the Litz wire toward an inner portion of the Litz wire to minimize the skin effect that is active in conductors carrying high frequency alternating currents.

In some implementations, a first endpoint of the first winding path (for the first coil 902) may be an input to the entire coil arrangement (and the first coil 902), while a second endpoint of the first winding path may be the same as the first endpoint of the second winding path (for the second coil 904). Similarly, a second endpoint of the second winding path may be an output of the entire coil arrangement (and the second coil 904).

As shown in FIG. 11 and with respect to the second coil 904, the first winding 1120 is wound on the first layer, while the second winding 1122 is wound on the second layer over the first winding 1120. Likewise, the third winding 1124 is wound on the first layer inside and adjacent to the first winding 1120, while the fourth winding 1126 is wound on the second layer over the third winding 1124. The fifth 1128, sixth 1130, seventh 1132 and eighth 1134 windings are wound as described for the first 1120 through the fourth 1126 windings, respectively, though inside those windings. The conductor is finally output from the arrangement from the center of the second coil 904 and over or under the first coil and the second coil 902/904 adjacent to the input of the conductor. Since the second coil 904 is wound asymmetrically with respect to the first coil 902, the second coil 904 can be wound from the bottom up like the first coil 902. Furthermore, since the first 902 and second coils 904 are both wound from the bottom up, the plurality of ribs 912 (e.g., a plurality of guides) on the coil holder 910 may be used to guide each winding of each of the first 902 and second 904 coils for more accurate and efficient assembly, fabrication, construction and may also be used as a ramp to guide every other turn to the next level or layer. Accordingly, implementations according to FIGS. 9-11 provide a coil arrangement that does not require a gap between, or a small-radius bend in, the conductor of the first 902 and second 904 coils, that is wound from the bottom up for each of the first coil and the second coil, and that can be guided by ribs in an associated holder for each of winding. Thus, each of the first winding path and the second winding path comprise a plurality of successive winding groups and, in each of the plurality of successive winding groups, at least a portion of each winding of consecutive windings is disposed on top of an immediately previous winding on the holder 910 for a predetermined number of windings. Moreover, each of the successive winding groups of the first winding path is disposed along an outer perimeter of an immediately previous winding group and each of the successive winding groups of the second winding path is disposed along an inner perimeter of an immediately previous winding group.

In some implementations, the first coil 902 may be termed "first means for wirelessly transferring power," the second coil 904 may be termed "means for wirelessly transferring power," and the holder 910 may be termed "means for holding the first and second means for wirelessly transferring power in a predetermined winding pattern."

Figure 12:
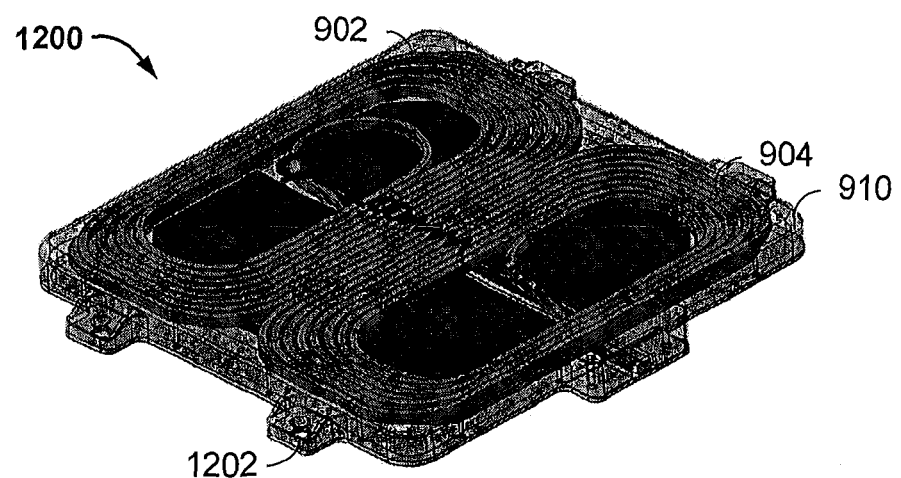
FIG. 12 illustrates an isometric view of an assembled pad including the coil arrangement and associated holder of FIGS. 9-11 flipped for mounting, in accordance with some implementations.

FIG. 12 illustrates an isometric view 1200 of an assembled pad including the coil arrangement and associated holder 910 of FIGS. 9-11 flipped for mounting. As shown, the coil arrangement including the first coil 902 and the second coil 904 installed in the holder 910 may be flipped from the view shown in FIGS. 9-11 and mounted via one or more mounting holes or brackets 1202. Thus, in the view of FIGS. 9-11, all "bottom up," "top down," "first layer," "second layer," and "over" descriptions of FIGS. 9-11 would be reversed in FIG. 12.

In some implementations, the stacked coil arrangements shown in FIGS. 9-12 have an increased thickness as compared to single layer coil arrangements. Thus, in some implementations, a ferrite structure located above or below the stacked coil arrangement may have chamfered edges in order to accommodate the increased thickness of at least portions of the stacked coil arrangement while maintaining a similar pad thickness to that of a single layer coil arrangement.

Figure 13:
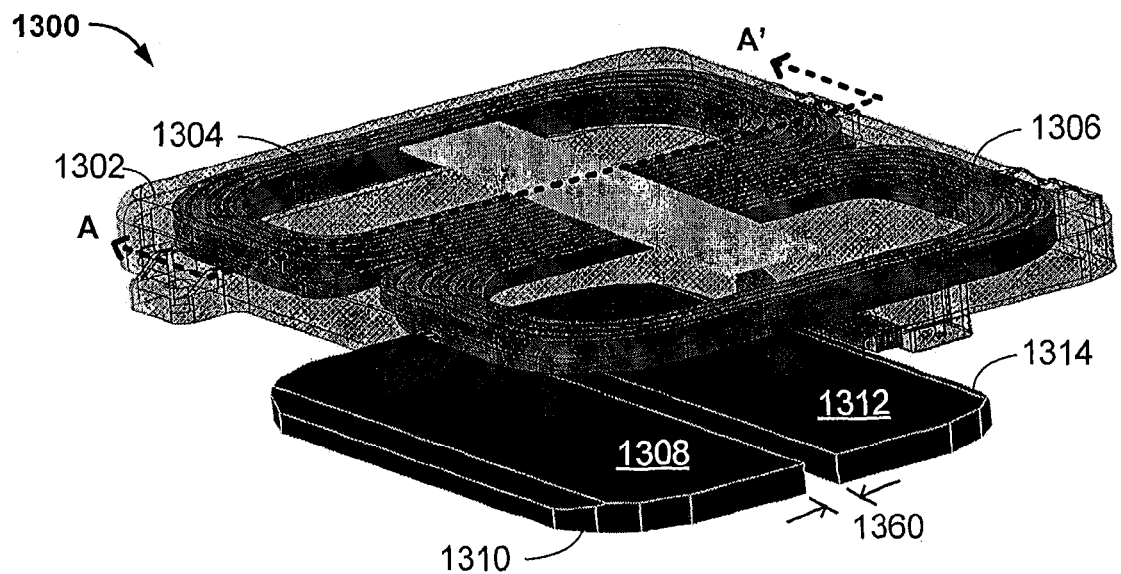
FIG. 13 illustrates an isometric exploded view of a wireless electric vehicle charging pad comprising chamfered ferrite, in accordance with some implementations.

FIG. 13 illustrates an isometric exploded view of a wireless electric vehicle charging (WEVC) pad 1300 comprising chamfered ferrite 1308, 1312, in accordance with some implementations. The WEVC pad 1300 may be a base pad (e.g., a wireless charging power transmitter) or a vehicle pad (e.g., a wireless charging power receiver). Where the WEVC pad 1300 is a base pad, the orientation shown in FIG. 13 would be substantially as mounted. Where the WEVC pad 1300 is a vehicle pad, the orientation shown in FIG. 13 would be flipped upside down from its orientation substantially as mounted. As shown in FIG. 13, the WEVC pad 1300 may comprise a first stacked coil 1304, a second stacked coil 1306 and a coil holder 1302 (e.g., cover or housing). Although the first coil 1304 and the second coil 1306 are identified separately, in some implementations they may be wound from the same conductor, and thus may be thought of as part of a single coil or coil arrangement. The first 1304 and second 1306 stacked coils may comprise multiple layers of windings, as will be described in more detail in connection with the section view 1400 of the WEVC pad 1300 in FIG. 14. The WEVC pad 1300 may also include a ferrite structure comprising one or more ferrite plates 1308 and 1312. Although two ferrite plates are shown in FIG. 13, the present application is not so limited and any number of ferrite plates or tiles (e.g., structures) may be utilized. For example, the present implementations illustrate two ferrite plates 1308, 1312 in order to provide a gap 1360 between the ferrite plates 1308, 1312 for routing the conductor(s) of the first 1304 and/or second 1306 coils into and/or out of the WEVC pad 1300. However, a single ferrite plate having a groove in the location of the gap 1360 is also contemplated by the present application. Since the first 1304 and second 1306 stacked coils have an increased thickness where two or more stacked layers of windings are present, there is a reduced space for ferrite immediately under or over the coils at those locations. Thus, in order to reduce the ferrite and pad 1300 thickness, the ferrite plates 1308 and 1312 may have one or more chamfered edges 1310 and 1314, respectively (e.g., the outside edges). Although FIG. 13 shows an entire side or edge of the ferrite plates 1308, 1312, the present application is not so limited and for any figure discussed herein, for any chamfered edge, either the entire edge, or only a portion of the edge may be chamfered, according to the particular implementation.

Figure 14:
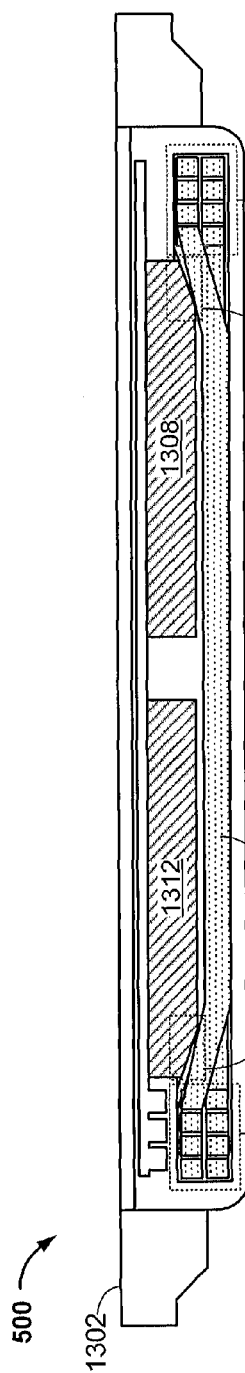
FIG. 14 illustrates a section side view of the wireless electric vehicle charging pad comprising chamfered ferrite of FIG. 13.

Chamfered edges on ferrite provide a host of positive benefits, including maximizing ferrite volume, since the ferrite plates 1308, 1312 may span a larger area (e.g., under the transition regions from single layer to stacked layer portions of the first 1304 and second 1306 coils) as compared to straight-edged ferrite plates, which would have to be cut to dimensions that do not extend under such transition regions in order to maintain the same pad height as with a single layer coil arrangement. In addition, having the larger dimensions of the ferrite plates 1308, 1312 improves magnetic performance, since more lines of magnetic flux may be captured by the ferrite plates 1308, 1312 at the edges of the WEVC pad 1300. Moreover, the form of the ferrite plates 1308, 1312 and/or the gap 1360 may provide for routing of the conductor(s) of the first 1304 and second 1306 coils. Finally, a larger ferrite volume also improves thermal performance, since a larger ferrite volume generates less losses. FIG. 14 may more clearly show the benefits of the design of FIG. 13.

FIG. 14 illustrates a section side view 1400 of the wireless electric vehicle charging pad 1300 comprising the chamfered ferrite 1308, 1312 of FIG. 13. As shown, FIG. 14 illustrates the section side view 1400 of FIG. 13 taken along the cut line A-A'. The coil holder 1302 may hold the first coil and the second coil, though at the cut line A-A', only the first coil 1304 is visible. The first coil 1304 may have a portion of only a single layer of windings, and portions 1316 and 1318 on particular sides of the coil 1304 where the windings are stacked into multiple layers of windings. Thus, between these single layer portions and multiple layer portions lies a region where the conductor of the coil 1304 may transition from a lower layer (e.g., a first layer) to a higher layer (e.g., a second layer), as denoted by the diagonal lines of the coil 1304 leading from the single layer portion to the multiple layer portions 1316, 1318. The ferrite plates 1308 and 1312 each have chamfered edges 1310 and 1314, respectively. Since the angles and/or shapes of the transitions of the coil 1304 and of the chamfered edges 1310 and 1314 are substantially the same, an increased width and length of the ferrite plates 1308, 1312, at least to the extent of the transition regions, is achievable while maintaining the same pad height as would be achievable with a fully single-layered coil arrangement. Thus, an angle of a surface of the chamfered edges 1310 and 1314 may be substantially the same as a transition angle of the conductor from the single layer to the multiple layers. Moreover, a space provided for the conductor of the coil 1304 to transition from the single layer to the multiple layers may comprise a portion of the ferrite plate removed by the chamfered edges 1310 and 1314. Thus, at least a portion of the ferrite plates 1308 and 1312 are disposed in a plane in which the second layer of windings (e.g., any layer that the coils 1304, 1306 transition to) is wound. To more easily appreciate the differences in ferrite plate size achievable, reference will now be made to FIGS. 15 and 16, where a side by side comparison may be made.

Figure 15:
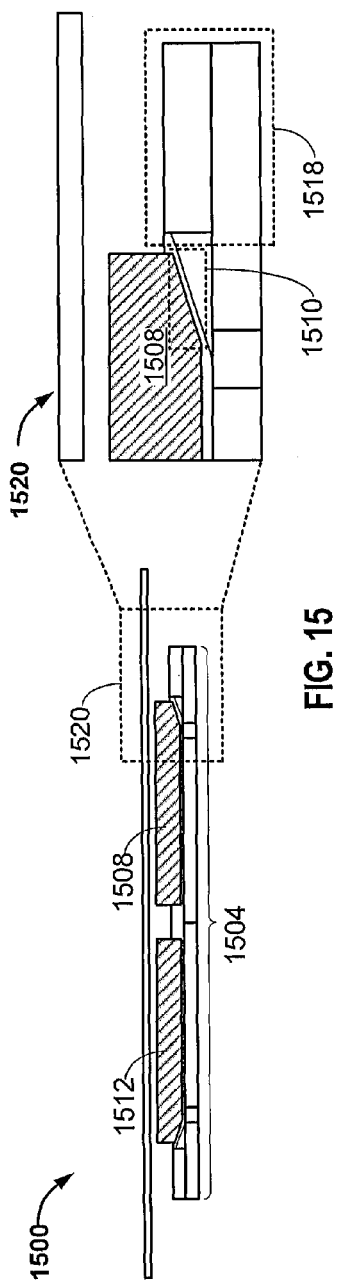
FIG. 15 illustrates a side view of a wireless electric vehicle charging pad comprising chamfered ferrite including an exploded view of a chamfered ferrite edge, in accordance with some implementations.

FIG. 15 illustrates a side view of a wireless electric vehicle charging pad 1500 comprising chamfered ferrite 1508, 1512 including an exploded view 1520 of a chamfered ferrite edge 1510, in accordance with some implementations. FIG. 15 shows ferrite plates 1508 and 1512 located adjacent to a coil 1504. As with FIG. 14, though multiple coils may be present in the pad 1500, only the coil 1504 is visible in this particular cutaway. As shown in the exploded view 1520, the coil 1504 transitions from the single layer winding portion to the multi-layer winding portion 1518, as depicted by the diagonal line. The ferrite plate 1508 includes at least one chamfered edge 1510 such that space is provided for the transition of the coil conductor from one winding layer to an elevated winding layer. As will be apparent upon comparison with the ferrite plate 1608 having a straight-cut edge 1610 in FIG. 16, the ferrite plate 1508 may extend to a further degree laterally toward the outside of the coil 1504 than can the ferrite plate 1608 toward the outside of the coil 1604 assuming the same pad thickness or height.

Figure 16:
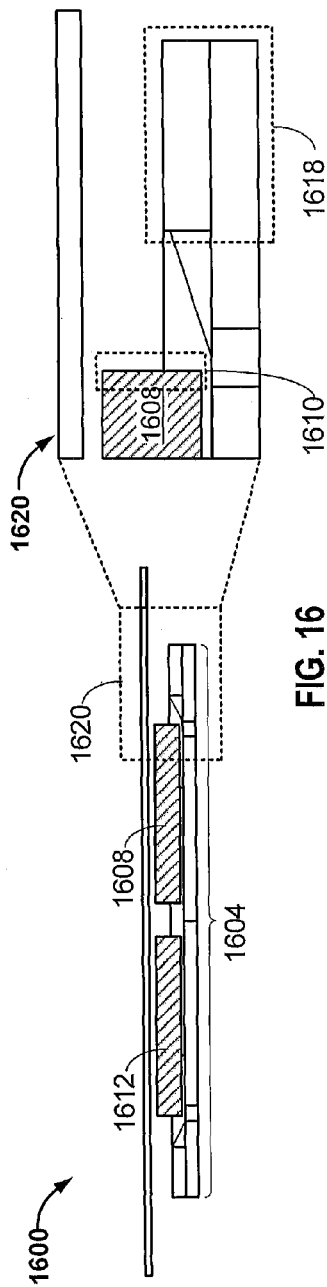
FIG. 16 illustrates a side view of a wireless electric vehicle charging pad comprising straight cut ferrite including an exploded view of a straight cut ferrite edge.

FIG. 16 illustrates a side view of a wireless electric vehicle charging pad 1600 comprising straight cut ferrite 1608, 1612 including an exploded view 1620 of a straight cut ferrite edge 1610. FIG. 16 shows ferrite plates 1608 and 1612 located adjacent to a coil 1604. As with FIG. 14, though multiple coils may be present in the pad 1600, only the coil 1604 is visible in this particular cutaway. As shown in the exploded view 1620, the coil 1604 transitions from the single layer winding portion to the multi-layer winding portion 1618, as depicted by the diagonal line. Instead of a chamfered edge, as in FIG. 15, the ferrite plate 1608 includes a straight cut edge 1610 that is cut substantially short of the transition area in order to provide space for the transition of the coil conductor from one winding layer to an elevated winding layer. Thus, in order to keep the same pad height as for a single layer coil arrangement, the ferrite plates 1608 and 1612 having straight cut edges 1610 must have smaller dimensions than the ferrite plates 1508 and 1512 having chamfered edges 1510.

In order to further appreciate some of the benefits of the chamfered edged ferrite over the straight edged ferrite, TABLE 1 below shows performance measurements taken from tested or simulated vehicle pads having chamfered versus straight cut edges, as previously described, as well as the change (e.g., improvement) between the chamfered solution versus the straight cut solution while wirelessly receiving charging power from a base pad. As shown, in TABLE 1, the straight cut ferrite vehicle pad performs more poorly than the chamfered edge ferrite vehicle pad in measured or simulated aspects.

TABLE 1

| Vehicle Pad | Chamfered | Cut | Change |
| --- | --- | --- | --- |
| Max. Coupling | 21.7% | 21.4% | +0.3% |
| Min. Magnetic Efficiency | 96.31% | 96.15% | +0.16% |
| Power Loss in VP/BP | 44 W/74.6 W | 46 W/78.1 W | −2 W/−3.5 W (−4.5%) |
| B-field Emissions 10 cm from simulated shield | 29.2 µT | 30.1 µT | −0.9 µT |

Figure 17:
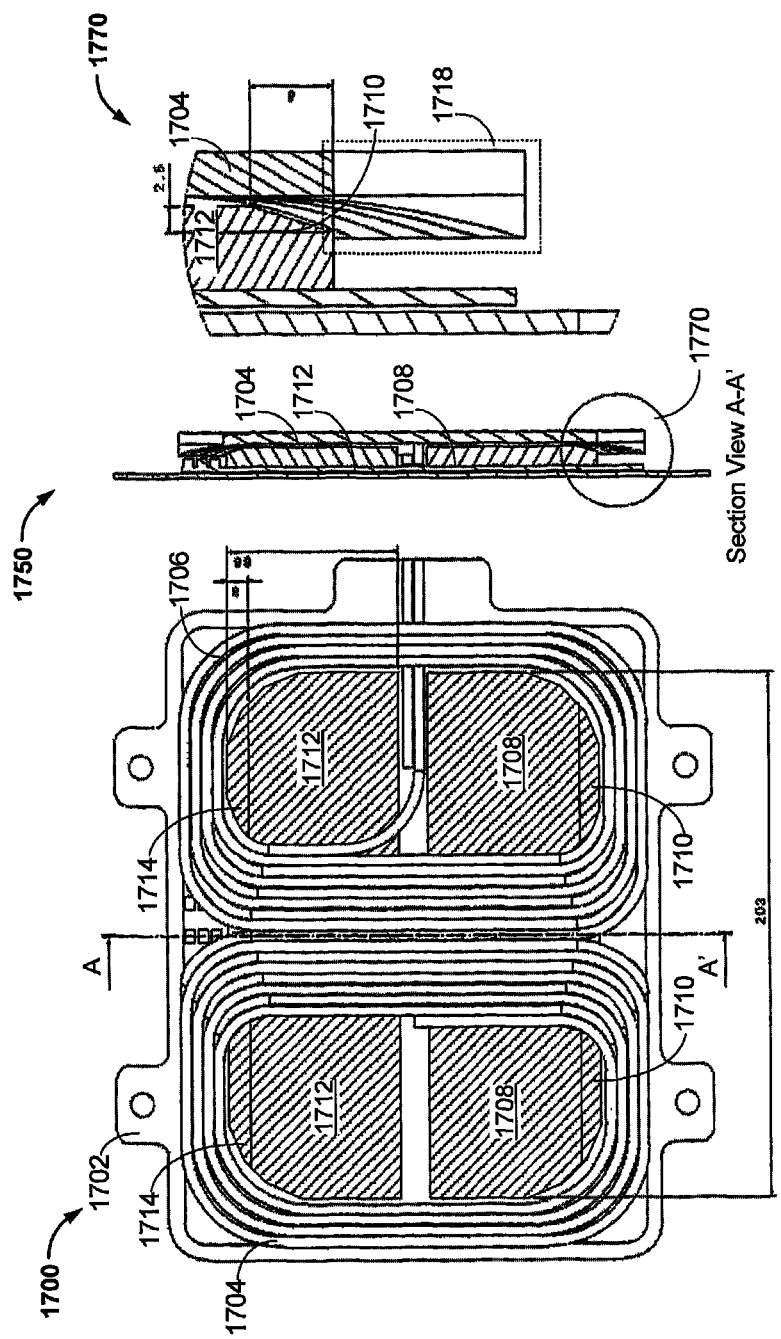
FIG. 17 illustrates a bottom view, a section view, and an exploded view of a wireless vehicle charging pad comprising chamfered ferrite, in accordance with some implementations.

In order to fully appreciate the increases in allowable physical size of the ferrite plates, reference will now be made to FIG. 17, which illustrates a bottom view, a section view 1750, and an exploded view 1770 of a wireless vehicle charging pad 1700 comprising chamfered ferrite 1708, 1712, in accordance with some implementations. In the bottom view, the charging pad 1700 comprises a back plate 1702, a first coil 1704 and a second coil 1706. Beneath the first 1704 and second 1706 coils are ferrite plates 1708 and 1712 comprising at least one chamfered edge 1710 and 1714, respectively. In the particular implementation of FIG. 17, the ferrite plates 1708 and 1712 may each have a total width of 66 mm, 8 mm of those 66 mm provided as the chamfered edges 1710 and 1714, and a total length of 203 mm.

The section view 1750, denoted by the line A-A' in the bottom view, shows the cutaway of the first coil 1704 and the ferrite plates 1708 and 1712. The exploded view of the area 1770 shown at the right of FIG. 17 further illustrates that the chamfered edge 1710 may provide space for the transition of the coil 1704 from the single layer to the multiple-layer portion 1718 via a chamfered edge having chamfering depth of approximately 2.5 mm for a chamfering width of 8 mm. In this particular implementation, the inclusion of the chamfered edges 1710 and 1712 may allow for an increased total ferrite volume of approximately 9.2%, as compared to a straight cut ferrite edge having the same thickness, where at least the chamfered 8 mm of each of the edges 1710 and 1712 would not be present. In such implementations, because the chamfered edges 1710 and 1712 provide space for the transition of the coil windings from a first layer to an elevated layer, the pad 1700 may be fabricated having a height that is approximately 2.5 mm thinner than would be the case for implementations employing the straight cut ferrite edges. The increased ferrite volume is advantageous for the above mentioned reasons as well as because the cost of raw ferrite materials is relatively inexpensive. Moreover, for the straight cut ferrite edges, empty space may have to be filled with another material (e.g., epoxy), which would add comparable costs. Furthermore, although the differences in performance between the chamfered ferrite edges versus the straight cut ferrite edges may seem small, these advantages grow for larger pad implementations, for higher power transfers, and for systems supporting greater distance ranges between the vehicle and the ground (e.g., between the vehicle pad and base pad, respectively), as compared to the approximately 30 mm "z-gap range" utilized in FIG. 17. Implementations of the above chamfered ferrite concepts in a vehicle pad positioned over a base pad will now be described in connection with FIGS. 18 and 19.

Figure 19:
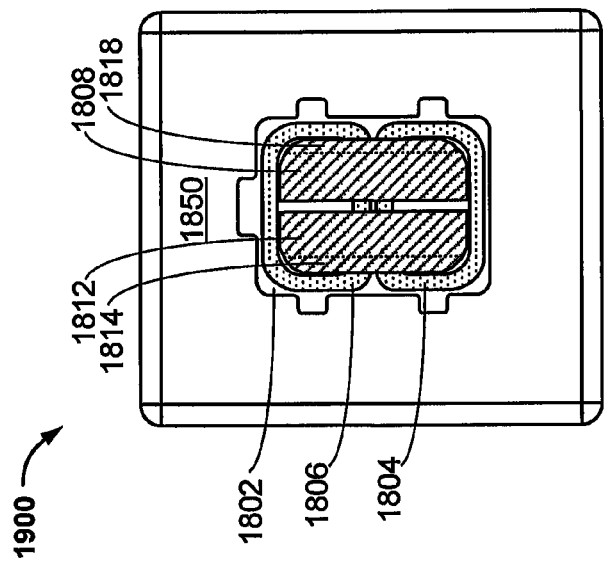
FIG. 19 illustrates a top view of the wireless electric vehicle charging pad comprising chamfered ferrite disposed over the wireless base charging pad of FIG. 9.
Figure 18:
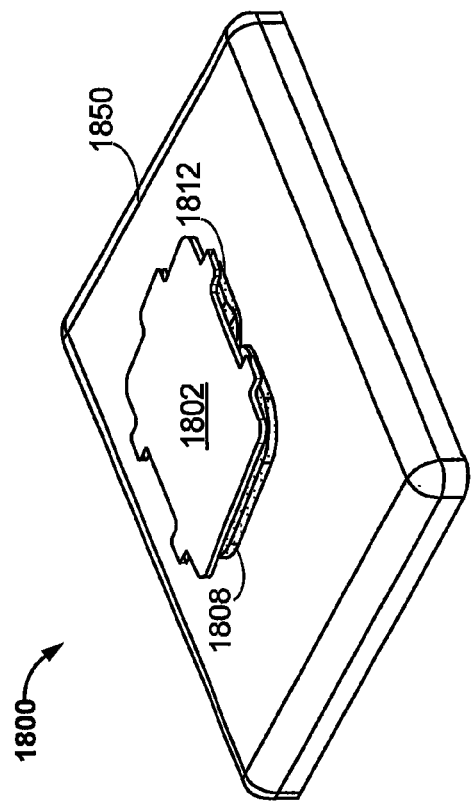
FIG. 18 illustrates an isometric view of a wireless electric vehicle charging pad comprising chamfered ferrite disposed over a wireless base charging pad, in accordance with some implementations.

FIG. 18 illustrates an isometric view of a wireless electric vehicle charging pad 1800 comprising chamfered ferrite 1808, 1812 disposed over a wireless base charging pad 1850, in accordance with some implementations. In FIGS. 18 and 19, the vehicle pad may have a "double D" coil arrangement. In some implementations, the base pad may have a "double D" coil arrangement. The vehicle pad may comprise a holder 1802, one or more ferrite plates 1808, 1812 having respective chamfered edges 1818, 1814 (see FIG. 19) disposed adjacent to the back plate 1802, and the "double D" coil arrangement of a first coil 1804 and a second coil 1806 (See FIG. 19). The vehicle pad is illustrated as disposed over the base pad 1850. A top view of this arrangement may be described in connection with FIG. 19 in order to more fully appreciate the arrangement of each of the above-described components.

FIG. 19 illustrates a top view 1900 of the wireless electric vehicle charging pad 1800 comprising the chamfered ferrite 1808, 1812 disposed over the wireless base charging pad 1800 of FIG. 18. As shown in FIG. 19, the vehicle pad is disposed over the base pad 1850. Within the vehicle pad, although the back plate 1802 appears to be below (e.g., behind) the other components, this is only for easy illustration, and the back plate 1802 is actually closest to the viewer of FIG. 19. It may be helpful to imagine the back plate 1802 as transparent except for its outer edges for context. Thus, the ferrite plates 1808 and 1812 having the respective chamfered edges 1818, 1814 (disposed on the underside of the ferrite plates 1808, 1812 as from this illustration's view) may be disposed adjacent to the holder 1802, and the first coil 1804 and the second coil 1806 may be disposed adjacent to the ferrite plates 1808, 1812.

Figure 20:
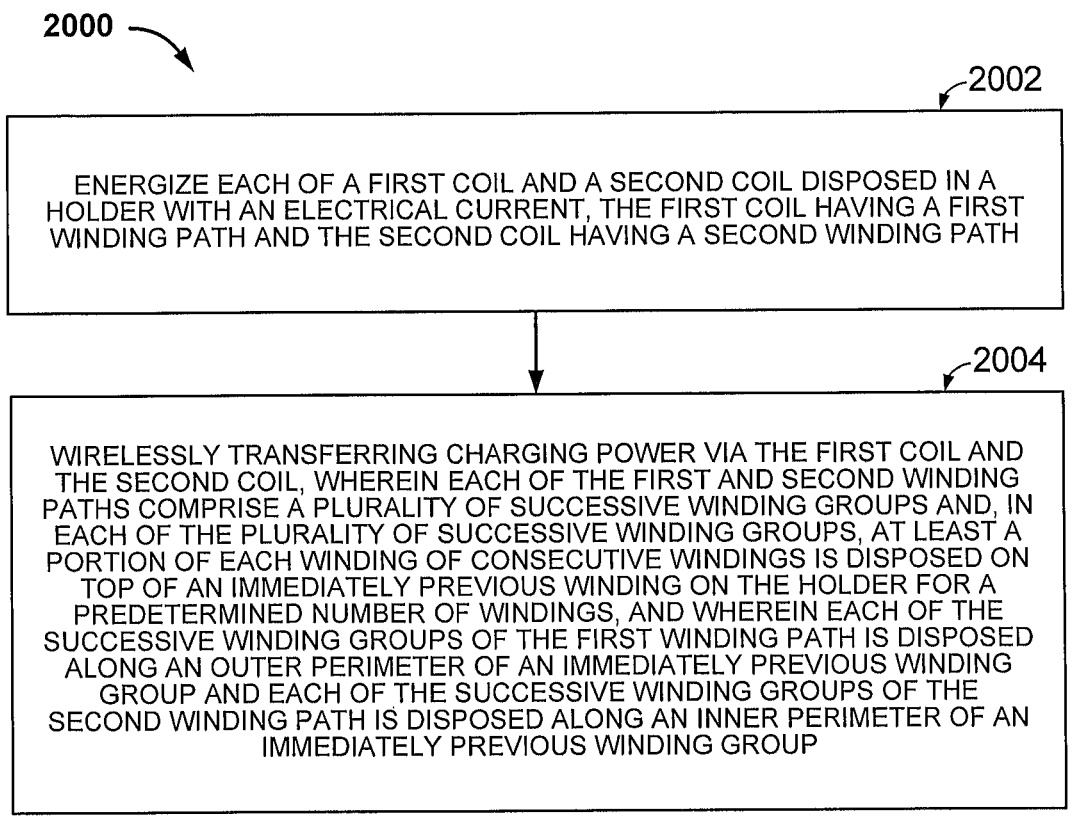
FIG. 20 is a flowchart depicting a method for wirelessly transferring charging power, in accordance with some implementations.

FIG. 20 is a flowchart 2000 depicting a method for wirelessly transferring charging power, in accordance with some implementations. The method of flowchart 2000 is described herein with reference to the asymmetrically wound coil arrangement as previously described in connection with FIGS. 9-12. In some implementations, one or more of the blocks in flowchart 2000 may be performed by a controller such as, for example, the transmit circuitry 206 or receive circuitry 210 as previously described in connection with FIG. 2. Although the method of flowchart 2000 is described herein with reference to a particular order, in various implementations, blocks herein may be performed in a different order, or omitted, and additional blocks may be added. In some implementations, the flowchart 2000 may apply to either a transmit coupler (e.g., a base pad) or a receive coupler (e.g., a vehicle coupler).

The flowchart 2000 may start with block 2002, which includes energizing each of a first coil (e.g., the first coil 902) and a second coil (e.g., the second coil 904) disposed in a holder (e.g., the holder 910) with an electrical current. The first coil has a first winding path and the second coil has a second winding path.

The flowchart 2000 may then advance from block 2002 to block 2004, which includes wirelessly transferring charging power via the first coil and the second coil. Each of the first winding path and the second winding path comprise a plurality of successive winding groups and, in each of the plurality of successive winding groups, at least a portion of each winding of consecutive windings is disposed on top of an immediately previous winding on the holder for a predetermined number of windings. Moreover, each of the successive winding groups of the first winding path is disposed along an outer perimeter of an immediately previous winding group and each of the successive winding groups of the second winding path is disposed along an inner perimeter of an immediately previous winding group.

Figure 21:
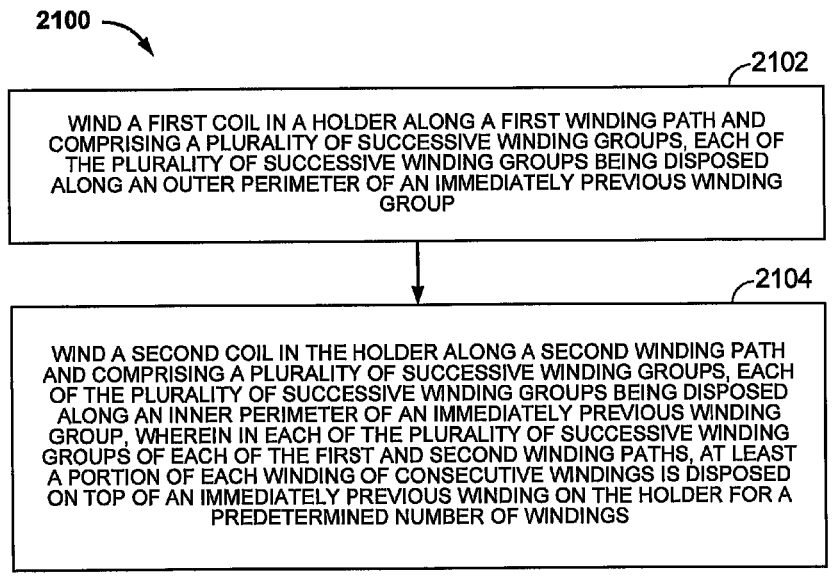
FIG. 21 is a flowchart depicting a method for fabricating an apparatus for wirelessly transferring charging power, in accordance with some implementations.

FIG. 21 is a flowchart 2100 depicting a method for fabricating an apparatus for wirelessly transferring charging power, in accordance with some implementations. The method of flowchart 2100 is described herein with reference to the asymmetrically wound coil arrangement as previously described in connection with FIGS. 9-12. In some implementations, one or more of the blocks in flowchart 2100 may be performed by an automated machine or alternatively by a person. Although the method of flowchart 2100 is described herein with reference to a particular order, in various implementations, blocks herein may be performed in a different order, or omitted, and additional blocks may be added. In some implementations, the flowchart 2100 may apply to fabrication of either a transmit coupler (e.g., a base pad) or a receive coupler (e.g., a vehicle coupler).

The flowchart 2100 may start with block 2102, which includes winding a first coil (e.g., the first coil 902) within a holder (e.g., the holder 910) along a first winding path and comprising a plurality of successive winding groups, each of the plurality of successive winding groups being disposed along an outer perimeter of an immediately previous winding group.

The flowchart 2100 may then advance from block 2102 to block 2104, which includes winding a second coil (e.g., along a second winding path and comprising a plurality of successive winding groups, each of the plurality of successive winding groups being disposed along an inner perimeter of an immediately previous winding group. In each of the plurality of successive winding groups of each of the first winding path and the second winding path, at least a portion of each winding of consecutive windings is disposed on top of an immediately previous winding on the holder for a predetermined number of windings.

Figure 22:
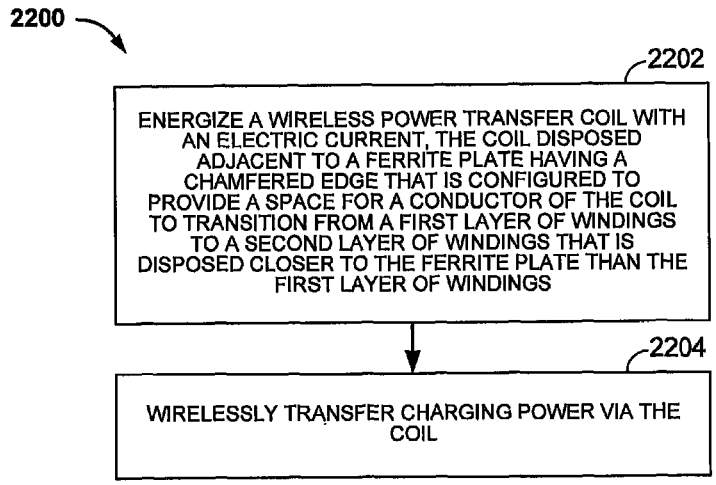
FIG. 22 is a flowchart depicting another method for wirelessly transferring charging power, in accordance with some implementations.

FIG. 22 is a flowchart 2200 depicting another method for wirelessly transferring charging power, in accordance with some implementations. The method of flowchart 2200 is described herein with reference to the wireless power transfer apparatuses as previously described in connection with FIGS. 13-18. In some implementations, one or more of the blocks in flowchart 2200 may be performed by a controller such as, for example, within the transmit circuitry 206 or the receive circuitry 210 of FIG. 2. Although the method of flowchart 2200 is described herein with reference to a particular order, in various implementations, blocks herein may be performed in a different order, or omitted, and additional blocks may be added.

The flowchart 2200 may start with block 2202, which includes energizing a wireless power transfer coil with an electric current, the coil disposed adjacent to a ferrite plate having a chamfered edge that is configured to provide a space for a conductor of the coil to transition from a first layer of windings to a second layer of windings that is disposed closer to the ferrite plate than the first layer of windings.

In some implementations, the flowchart 2200 may then advance to block 2204, which includes wirelessly transferring charging power via the coil.

Figure 23:
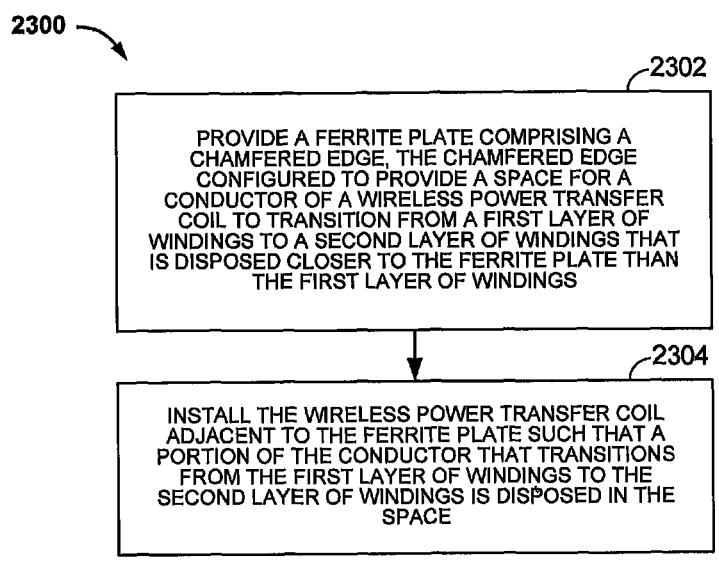
FIG. 23 is a flowchart depicting another method for fabricating an apparatus for wirelessly transferring charging power, in accordance with some implementations.

FIG. 23 is a flowchart 2300 depicting another method for fabricating an apparatus for wirelessly transferring charging power, in accordance with some implementations. The method of flowchart 2300 is described herein with reference to the wireless power transfer apparatuses as previously described in connection with FIGS. 13-18. In some implementations, one or more of the blocks in flowchart 2300 may be performed by an automated machine or alternatively by a person. Although the method of flowchart 2300 is described herein with reference to a particular order, in various implementations, blocks herein may be performed in a different order, or omitted, and additional blocks may be added.

The flowchart 2300 may start with block 2302, which includes providing a ferrite plate comprising a chamfered edge, the chamfered edge configured to provide a space for a conductor of a wireless power transfer coil to transition from a first layer of windings to a second layer of windings that is disposed closer to the ferrite plate than the first layer of windings.

In some implementations, the flowchart 2300 may then advance to block 2304, which includes installing the wireless power transfer coil adjacent to the ferrite plate such that a portion of the conductor that transitions from the first layer of windings to the second layer of windings is disposed in the space.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the implementations.

The various illustrative blocks, modules, and circuits described in connection with the implementations disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the implementations disclosed herein may be embodied directly in hardware, in a software module executed by a processor, or in a combination of the two. If implemented in software, the functions may be stored on or transmitted over as one or more instructions or code on a tangible, non-transitory, computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features have been described herein. It is to be understood that not necessarily all such advantages may be achieved in accordance with any particular implementation. Thus, one or more implementations achieves or optimizes one advantage or group of advantages as taught herein without necessarily achieving other advantages as may be taught or suggested herein.

Various modifications of the above described implementations will be readily apparent, and the generic principles defined herein may be applied to other implementations without departing from the spirit or scope of the application. Thus, the present application is not intended to be limited to the implementations shown herein but is to be accorded the widest scope consistent with the principles and novel features disclosed herein.

What is claimed is:

1. An apparatus for wirelessly transferring charging power, comprising:
   a first coil having a first winding path;
   a second coil having a second winding path, the second coil comprising a conductor shared with the first coil, wherein the first and second coils are connected in series; and
   a holder configured to hold the first coil and the second coil in a predetermined winding pattern,
   wherein each of the first winding path and the second winding path comprise a plurality of successive winding groups and, in each of the plurality of successive winding groups, at least a portion of each winding of consecutive windings is disposed on top of an immediately previous winding on the holder for a predetermined number of windings, and
   wherein each of the successive winding groups of the first winding path is disposed along an outer perimeter of an immediately previous winding group and each of the successive winding groups of the second winding path is disposed along an inner perimeter of an immediately previous winding group.

2. The apparatus of claim 1, wherein the holder further comprises a plurality of guides for guiding the windings of each of the first coil and the second coil.

3. The apparatus of claim 1, wherein the first winding path of the first coil is wound in one of a clockwise direction and a counterclockwise direction and the second winding path of the second coil is wound in the other of the clockwise direction and the counterclockwise direction in the holder.

4. The apparatus of claim 1, wherein the first coil and the second coil are disposed adjacent to each other such that a gap between the first coil and the second coil is less than a width of either of the first and second winding paths.

5. The apparatus of claim 1, further comprising a ferrite plate having a chamfered edge, the chamfered edge configured to provide a space for a conductor of at least one of the first coil and the second coil to transition from a first layer of windings to a second layer of windings that is disposed closer to the ferrite plate than the first layer of windings.

6. The apparatus of claim 5, wherein the space comprises a portion of the ferrite plate removed by the chamfered edge.

7. The apparatus of claim 5, wherein at least a portion of the ferrite plate is disposed in a plane in which the second layer of windings is wound.

8. The apparatus of claim 5, wherein at least a portion of the chamfered edge extends laterally over a region where the conductor of the first coil and the second coil transitions from the first layer of windings to the second layer of windings.

9. A method for wirelessly transferring charging power, comprising:
energizing each of a first coil and a second coil disposed in a holder with an electrical current, the first coil having a first winding path and the second coil having a second winding path, the second coil comprising a conductor shared with the first coil, wherein the first and second coils are connected in series, and
wirelessly transferring charging power via the first coil and the second coil,
wherein each of the first winding path and the second winding path comprise a plurality of successive winding groups and, in each of the plurality of successive winding groups, at least a portion of each winding of consecutive windings is disposed on top of an immediately previous winding on the holder for a predetermined number of windings, and
wherein each of the successive winding groups of the first winding path is disposed along an outer perimeter of an immediately previous winding group and each of the successive winding groups of the second winding path is disposed along an inner perimeter of an immediately previous winding group.

10. The method of claim 9, wherein the holder comprises a plurality of guides for guiding the windings of each of the first coil and the second coil.

11. The method of claim 9, wherein the first winding path of the first coil is wound in one of a clockwise direction and a counterclockwise direction and the second winding path of the second coil is wound in the other of the clockwise direction and the counterclockwise direction in the holder.

12. The method of claim 9, wherein the first coil and the second coil are disposed adjacent to each other such that a gap between the first coil and the second coil is less than a width of either of the first and second winding paths.

13. The method of claim 9, wherein a ferrite plate has a chamfered edge configured to provide a space for a conductor of at least one of the first coil and the second coil to transition from a first layer of windings to a second layer of windings that is disposed closer to the ferrite plate than the first layer of windings.

14. The method of claim 13, wherein the space comprises a portion of the ferrite plate removed by the chamfered edge.

15. The method of claim 13, wherein at least a portion of the ferrite plate is disposed in a plane in which the second layer of windings is wound.

16. The method of claim 13, wherein at least a portion of the chamfered edge extends laterally over a region where the conductor of the first coil and the second coil transitions from the first layer of windings to the second layer of windings.

17. A non-transitory, computer-readable medium comprising code that, when executed, causes an apparatus for wirelessly transferring charging power to perform a method comprising:
energizing each of a first coil and a second coil disposed in a holder with an electrical current, the first coil having a first winding path and the second coil having a second winding path, the second coil comprising a conductor shared with the first coil, wherein the first and second coils are connected in series,
wirelessly transferring charging power via the first coil and the second coil,
wherein each of the first winding path and the second winding path comprise a plurality of successive winding groups and, in each of the plurality of successive winding groups, at least a portion of each winding of consecutive windings is disposed on top of an immediately previous winding on the holder for a predetermined number of windings, and
wherein each of the successive winding groups of the first winding path is disposed along an outer perimeter of an immediately previous winding group and each of the successive winding groups of the second winding path is disposed along an inner perimeter of an immediately previous winding group.

18. The medium of claim 17, wherein the holder comprises a plurality of guides for guiding the windings of each of the first coil and the second coil.

19. The medium of claim 17, wherein the first winding path of the first coil is wound in one of a clockwise direction and a counterclockwise direction and the second winding path of the second coil is wound in the other of the clockwise direction and the counterclockwise direction in the holder.

20. The medium of claim 17, wherein the first coil and the second coil are disposed adjacent to each other such that a gap between the first coil and the second coil is less than a width of either of the first and second winding paths.

21. The medium of claim 17, wherein a ferrite plate has a chamfered edge configured to provide a space for a conductor of at least one of the first coil and the second coil to transition from a first layer of windings to a second layer of windings that is disposed closer to the ferrite plate than the first layer of windings.

22. The medium of claim 21, wherein the space comprises a portion of the ferrite plate removed by the chamfered edge.

23. The medium of claim 21, wherein at least a portion of the ferrite plate is disposed in a plane in which the second layer of windings is wound.

24. The medium of claim 21, wherein at least a portion of the chamfered edge extends laterally over a region where the conductor of the first coil and the second coil transitions from the first layer of windings to the second layer of windings.

25. A method for fabricating an apparatus for wirelessly transferring charging power, the method comprising:
- winding a first coil in a holder along a first winding path and comprising plurality of successive winding groups, each of the plurality of successive winding groups being disposed along an outer perimeter of an immediately previous winding group,
- winding a second coil in the holder along a second winding path and comprising a plurality of successive winding groups, each of the plurality of successive winding groups being disposed along an inner perimeter of an immediately previous winding group, the second coil comprising a conductor shared with the first coil, wherein the first and second coils are connected in series, and
- wherein in each of the plurality of successive winding groups of each of the first winding path and the second winding path, at least a portion of each winding of consecutive windings is disposed on top of an immediately previous winding on the holder for a predetermined number of windings.

26. The method of claim 25, wherein the holder comprises a plurality of guides for guiding the windings of each of the first coil and the second coil.

27. The method of claim 25, further comprising:
- winding the first winding path of the first coil in one of a clockwise direction and a counterclockwise direction in the holder, and
- winding the second winding path of the second coil in the other of the clockwise direction and the counterclockwise direction in the holder.

28. The method of claim 25, wherein the first coil and the second coil are disposed adjacent to each other such that a gap between the first coil and the second coil is less than a width of either of the first and second winding paths.

* * * * *